May 4, 1948.                J. H. DEER                    2,441,061
              SPINNER FOR STEERING WHEELS AND THE LIKE
                         Filed July 8, 1946
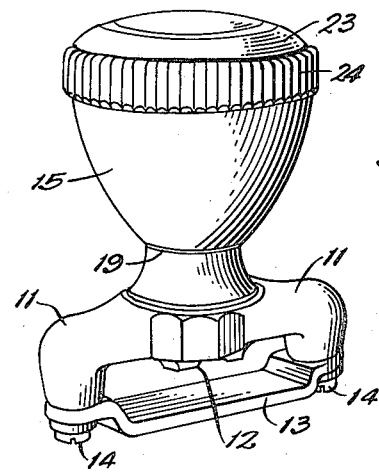
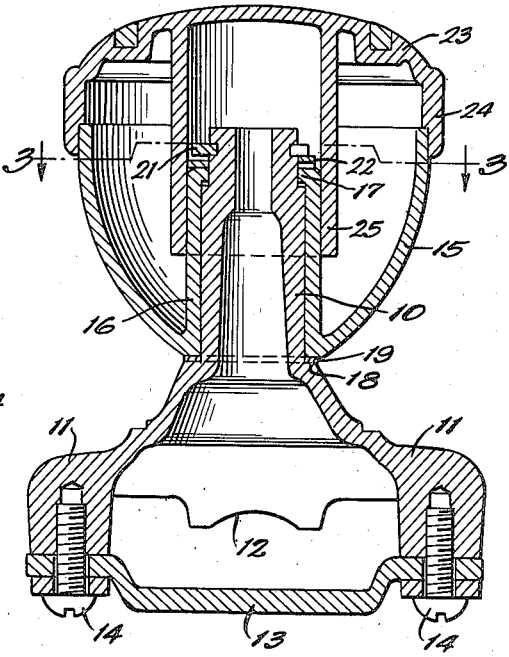
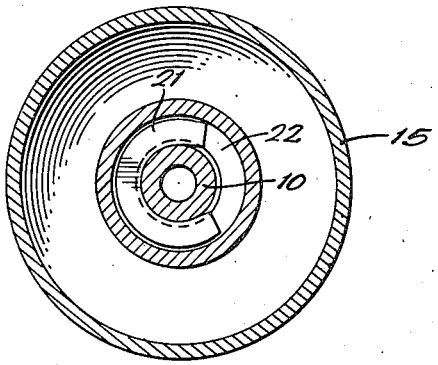
Inventor:
John H. Deer,
By Dawson, Booth and Spangenberg,
Attorneys.

Patented May 4, 1948

2,441,061

UNITED STATES PATENT OFFICE 2,441,061

SPINNER FOR STEERING WHEELS AND THE LIKE

John H. Deer, Chicago, Ill., assignor to Daniel Szantay, Chicago, Ill.

Application July 8, 1946, Serial No. 681,924

5 Claims. (Cl. 74—557)

This invention relates to spinners for steering wheels and the like and more particularly to detachable spinners which can be mounted as an accessory on the rim of an automobile steering wheel or the like.

One of the objects of the invention is to provide a spinner which is simple and inexpensive to manufacture and in which the parts are permanently assembled against any possibility of accidental displacement.

Another object is to provide a spinner in which a light friction drag is provided to resist slightly turning of the spinner knob.

A further object is to provide a spinner in which the parts may be held permanently together by interengagement thereof without requiring any threaded fastenings.

The above and other objects and advantages of the invention will be more readily apparent from the following description when read in connection with the accompanying drawing, in which—

Figure 1 is a perspective view of a spinner embodying the invention;

Figure 2 is a vertical section; and

Figure 3 is a section on the line 3—3 of Figure 2.

The spinner, as shown, comprises a post member having a cylindrical post portion 10 supported on a base 11 which may be provided with one or more seat portions 12 to seat against the rim of a steering wheel. The post and base portions may be hollow, as shown, and may conveniently be formed as a die casting or the like. The base portion is held against the steering wheel rim by a clamp bar 13 secured to the base portion by screws 14 or like fastenings. It will be understood that the post is secured to the rim of a conventional automobile steering wheel or the like to project upwardly therefrom.

The post is adapted to carry a knob to be gripped by the hand of the operator and which, as shown, comprises a body portion 15 which is hollow and is formed with a central tubular hub 16 to fit over the cylindrical post part 10. At its upper end the hub 16 may be turned in slightly, as shown at 17, to engage a reduced diameter portion at the outer end of the post. The inner end of the hub seats against an annular shoulder 18 at the inner end of the cylindrical post 10, a friction washer 19 being interposed if desired.

To hold the knob body 15 on the post, a fastener is provided secured to the end of the post, as shown, and the outer end of the post is formed with a peripheral groove into which a fastener strip such as a C washer 21 fits. The C washer 21 may be formed in the usual manner to extend slightly more than a semi-circle so that when it is forced into the groove in the post it tends to retain its position. A sinuous spring 22 is mounted between the washer 21 and the upper end of the hub 16 to urge the hub against the friction washer 19. This spring takes up any end play in the hub and may be made of the proper strength to provide the desired friction drag between the hub and the shoulder 18 so that the knob will not spin with an undesired degree of freedom.

The hollow knob body is closed by a cap indicated generally at 23 which may have any desired decorative configuration and which preferably includes a side flange portion 24 fitting over and cemented to the upper edge of the body. In case the body and cap are formed of plastic material cementing may be employed, while if they are of metal they may be soldered or sweated together to form a permanent assembly. The cap is provided in a central portion with a tubular sleeve 25 of a size to fit over the tubular hub 16 when the cap is assembled on the body. It will be noted that the sleeve 25 lies closely around the washer 21 positively to hold the washer against displacement out of the groove under all conditions. Thus when the cap is assembled on the body, as best seen in Figure 2, the entire spinner assembly is permanently connected together against any possibility of accidental disassembly.

While one embodiment of the invention has been shown and described in detail, it will be understood that this is illustrative only and is not intended as a definition of the scope of the invention, reference being had for this purpose to the appended claims.

What is claimed is:

1. A spinner for steering wheels comprising a post adapted to be secured to the rim of a wheel and to project therefrom, a spinner body formed with a central opening to fit rotatably over the post, a fastener connected to the outer end of the post to hold the spinner body thereon, and a cap for the body having a central sleeve portion fitting over the end of the post and the fastener to hold the fastener on the post.

2. A spinner for steering wheels comprising a post adapted to be secured to the rim of a wheel and to project therefrom, a hollow spinner body formed with a central tubular hub to fit rotatably over the post, a fastener on the outer end of the post to hold the hub thereon, and a cap for the spinner body having a central sleeve portion fitting over the tubular hub.

3. A spinner for steering wheels comprising a post adapted to be secured to the rim of a wheel and to project therefrom, a hollow spinner body formed with a central tubular hub to fit rotatably over the post, the outer end of the post being formed with a groove therein, a fastener strip fitting in the groove, and a cap for the spinner body having a central sleeve portion fitting over the tubular hub and holding the fastener strip against displacement out of the groove.

4. A spinner for steering wheels comprising a post adapted to be secured to the rim of a wheel and to project therefrom, a hollow spinner body formed with a central tubular hub to fit rotatably over the post, the outer end of the post being formed with a peripheral groove, a C-washer fitting in the groove to hold the spinner body on the post, and a cap for the body having a central sleeve portion fitting over the C washer and the tubular hub.

5. A spinner for steering wheels and the like comprising a post adapted to be secured to a wheel rim to project therefrom, and having an annular shoulder adjacent its inner end, a hollow spinner body formed with a central tubular hub to fit rotatably over the post and to engage the shoulder at one end, the post having a peripheral groove at its outer end, a fastener strip fitting in the groove, a spring between the fastener strip and the outer end of the hub to urge the hub against the shoulder, and a cap for the body having a central sleeve fitting over the hub and holding the strip against displacement from the groove.

JOHN H. DEER.

REFERENCES CITED

The following references are of record in the file of this patent:

UNITED STATES PATENTS

| Number | Name | Date |
|---|---|---|
| 751,496 | Gode | Feb. 9, 1904 |
| 1,072,079 | Bellows | Sept. 2, 1913 |
| 1,605,123 | Marple et al. | Nov. 2, 1926 |
| 2,101,519 | Thorp | Dec. 7, 1937 |
| 2,123,811 | Sinko | July 12, 1938 |